June 10, 1958  C. O. LARSON  2,838,081
MITER CLAMP AND GAUGE
Filed April 14, 1955  2 Sheets-Sheet 1
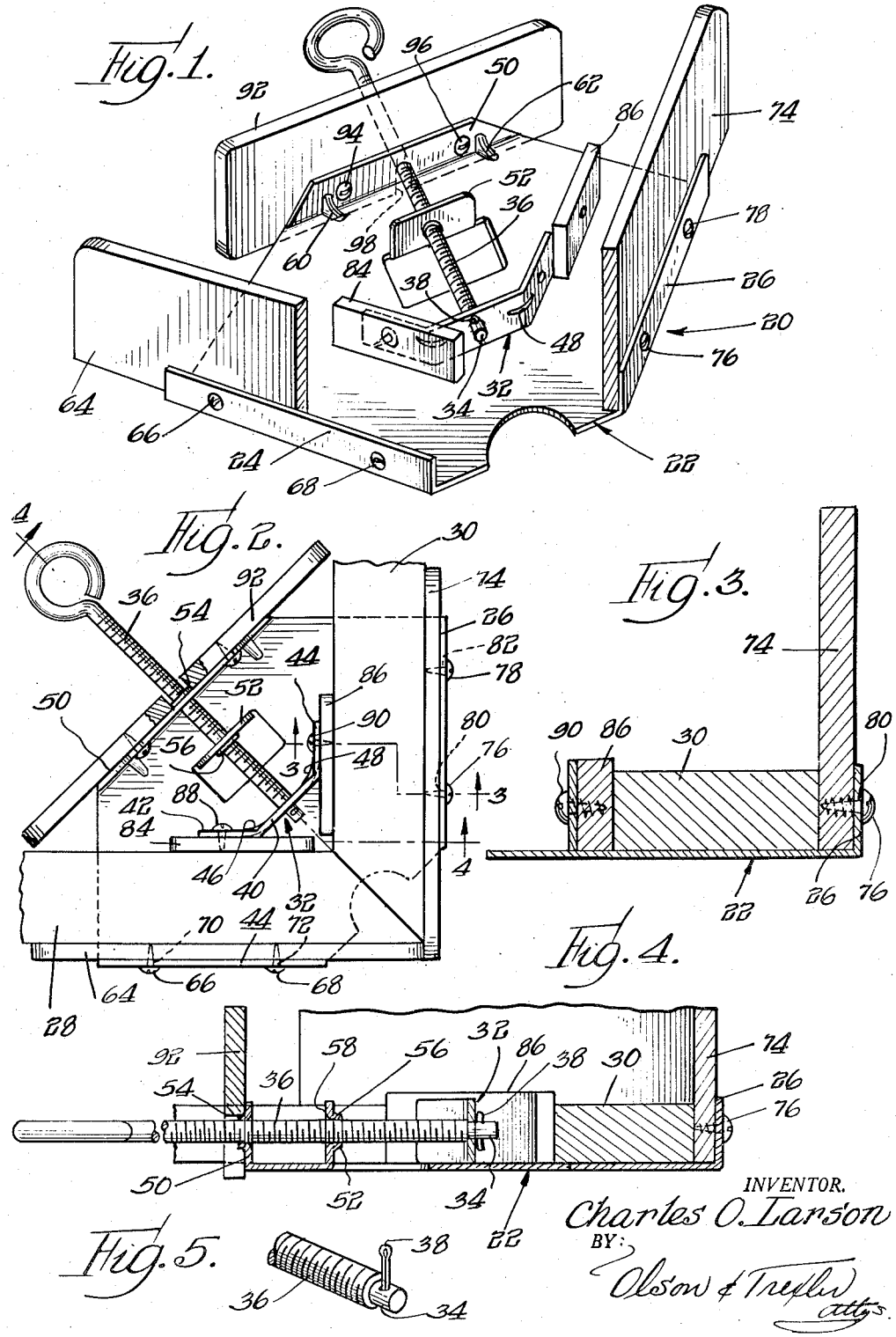
INVENTOR.
Charles O. Larson

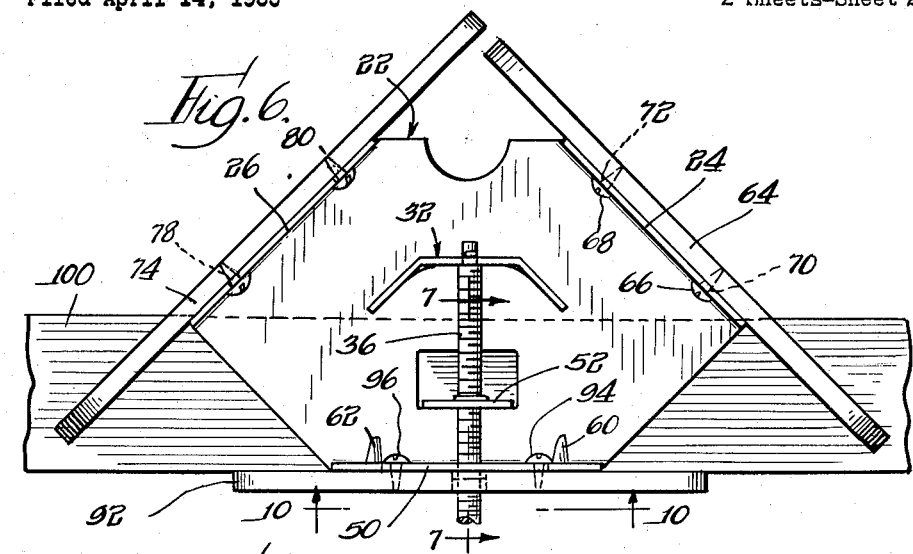

United States Patent Office 2,838,081
Patented June 10, 1958

2,838,081

MITER CLAMP AND GAUGE

Charles O. Larson, Sterling, Ill.

Application April 14, 1955, Serial No. 501,322

4 Claims. (Cl. 144—293)

The present invention relates to a novel device which may be used either as a miter clamp or a miter gauge.

An object of the present invention is to provide a novel device of the above mentioned general type which is of simple construction and may be relatively easily and economically manufactured.

A more specific object of the present invention is to provide a novel miter clamp having a sheet metal base portion and a screw operated clamping member, which miter clamp is provided with simple means for accurately supporting the clamping member and is constructed so that the clamping member will be locked against retrograde movement when tightened against a workpiece.

Another object of the present invention is to provide a novel device which may be used as a miter clamp or a miter gauge, which device includes a sheet metal base and is provided with means which may be selectively positioned for protecting a workpiece when the device is used as a clamp and for guiding and protecting a saw when the device is used as a miter gauge.

Other objects and advantages of the present invention will become apparent from the following description and the accompanying drawings wherein:

Fig. 1 is a perspective view which is partially exploded and partially broken away showing a device embodying the principles of this invention with the elements thereof positioned so that the device may be used as a miter clamp;

Fig. 2 is a plan view of the device shown in Fig. 1;

Fig. 3 is an enlarged sectional view taken along line 3—3 in Fig. 2;

Fig. 4 is an enlarged sectional view taken along line 4—4 in Fig. 2;

Fig. 5 is an exploded fragmentary perspective view showing certain elements of the device in greater detail;

Fig. 6 is a plan view showing how the device of this invention may be used as a miter gauge to cut a workpiece diagonally;

Fig. 7 is a fragmentary sectional view taken along line 7—7 in Fig. 6;

Fig. 8 is a plan view showing how the device of this invention may be used as a miter gauge for cutting a workpiece at a right angle;

Fig. 9 is a sectional view taken along line 9—9 in Fig. 8; and

Fig. 10 is a fragmentary sectional view taken along line 10—10 in Fig. 6.

Referring now more specifically to the drawings wherein like parts are designated by the same numerals throughout the various figures, a device 20 embodying the principles of this invention and assembled for use as a miter clamp is shown in Figs. 1 through 5. This device includes a sheet metal base 22 having upstanding marginal flanges 24 and 26 preferably disposed at right angles to each other for positioning workpieces 28 and 30 in the manner shown in Fig. 2. A clamping member 32 is provided for holding the workpieces in position, which clamping member is freely disposed on a reduced diameter end portion 34 of an elongated screw rod 36 and is removably held thereon by a cotter pin 38. The clamping member includes a central portion 40 and opposite end portions 42 and 44 which are disposed at right angles relative to each other. Traversing the bend line between the end portions 42 and 44, respectively, and the central portion 40 are ribs 46 and 48 which serve to strengthen and rigidify the clamping member and to prevent undue flexing of the end portions.

In order to support the screw rod and thus the clamping member in a firm and accurate manner, the base is provided with a plurality of integral upstanding screw rod receiving elements disposed behind the clamping member. More specifically, the base is formed with an upstanding marginal flange 50 and an upstanding intermediate flange 52, which flanges have aligned apertures for receiving the screw rod. The aperture in the flange 50 is defined by a short cylindrical portion 54 which is drawn from the flange 50 and which is internally threaded for cooperating with the screw rod. The aperture in the flange 52 is defined by a similar short cylindrical portion 56 which is also internally threaded for cooperation with the screw rod. It should be noted that the cylindrical portion 56 extends toward the clamping member so that it has an enlarged mouth 58 for facilitating initial insertion of the screw rod therethrough. It should also be noted that the flange 52 is struck from the body 22 so that it must be folded toward the flange 50 to reach its upright position and that the cylindrical portions 54 and 56 extend in opposite directions. With this arrangement the cylindrical portions 54 and 56 may be formed simultaneously before the flanges 50 and 52 have been folded to their upright positions as by a multiple spindle drawing punch. Rigidifying ribs 60 and 62 are formed so as to traverse the bend line between the flange 50 and the remainder of the body 22, and, if desired, similar rigidifying ribs may be formed in the flange 52.

With the screw rod supporting flanges 50 and 52 arranged in the manner described above, it is seen that they combine to provide the relatively lightweight sheet metal base 22 with relatively stiff and rugged means for backing up the clamping pressure applied when the screw is turned to force the clamping member against the workpieces. However, after the clamping member has been initially tightened against the workpieces, the screw rod may be tightened an additional small amount, and this will cause the clamping member and the flanges to be flexed slightly whereby the inherent resiliency of the sheet metal firmly urges the threads of the cylindrical portions 54 and 56 against the threads of the screw rod so as to lock the screw rod in the adjusted position.

When the workpieces 28 and 30 have finished surfaces which might be marred when clamped between metal parts, the clamping device may be provided with pads of wood or any other suitable material to prevent injury to the workpieces. More specifically, an elongated block 64 may be secured to the flange 24 by a pair of screws 66 and 68 respectively passing through apertures 70 and 72 in the flange. A similar block 74 may be secured to the flange 26 by screws 76 and 78 respectively passing through apertures 80 and 82 in the flange. Pads 84 and 86 may be secured to the end portions of the clamping member by screws 88 and 90, respectively. In addition, a block 92 is secured to the flange 50 by a pair of screws 94 and 96, which block may be used as a grip for holding the miter clamp. The block 92 is provided with a slot 98 for accommodating the screw rod.

In Figs. 6 through 10 the manner in which the above described elements may be assembled and used as a miter gauge is shown. More specifically, the blocks 64 and 74 are removed from the inner surfaces of the flanges 24 and 26, respectively, and secured to the outer surfaces of these flanges so as to provide guides for a saw or the like, not shown, used to cut a workpiece 100. When the device is to be used as a miter gauge the clamping member and screw rod may be left in assembled relationship with the base as shown or they may be removed, if desired, by first removing the cotter pin 38 and then unthreading the screw rod.

In order to cut the workpiece 100 on a diagonal the device is placed on top of the workpiece with the block 92 in alignment with the edge thereof as shown in Fig. 6. The block 92 may be formed so that its lower margin projects below the base 22 for engagement with the edge of the workpiece as shown in Figs. 7 and 10. When the device is positioned as shown in Figs. 6, 7 and 10, the workpiece may be easily cut by positioning a saw blade against either of the guide blocks 64 or 74, as will be understood. If it is desired to cut the workpiece at a right angle, it is merely necessary to position the device in the manner shown in Fig. 8 with one of the guide blocks aligned with the edge of the workpiece. It should be noted that the apertures in the guide block 64 and 74 into which the screws extend are positioned closer to one end of the blocks than the other. More specifically, the apertures are positioned so that the longer ends of the blocks extend for substantially completely traversing the workpiece 100 when the device is positioned as shown in Fig. 6.

While the preferred embodiment of the present invention has been shown and described herein, it is obvious that many structural details may be changed without departing from the spirit and scope of the appended claims.

The invention is claimed as follows:

1. A device of the type described comprising a sheet material body, a pair of angularly disposed members on said body providing guides for a pair of angularly disposed workpieces, a clamping member for holding said workpieces against said guide members, a flange extending from a margin of said body behind said clamping member, an internally threaded cylindrical section drawn from the plane of said marginal flange, an intermediate flange between said marginal flange and said clamping member, said intermediate flange being integral with and struck from within the material of said body and folded from the plane of the body toward said marginal flange, an internally threaded cylindrical section drawn from the plane of the intermediate flange, and an elongated screw member connected with and extending rearwardly from said clamping member and threaded through both of said internally threaded cylindrical sections for stable and accurate support of the screw member.

2. A device of the type described comprising a sheet metal body, a pair of right angularly disposed upstanding flanges on said body, a clamping member for urging the workpieces toward said flanges and clamped position, a third upstanding flange integral with a margin of said body angularly disposed with respect to both of said first mentioned flanges and located behind said clamping member, an intermediate upstanding flange between said third flange and said clamping member said third and intermediate flanges having aligned internally threaded aperture means therein, an elongated screw member connected with and extending rearwardly from said clamping member and threaded through said aperture means for adjustably supporting said clamping member, a pair of elongated blocks associated with said first mentioned flanges, means for selectively securing said blocks to inner surfaces of the first mentioned flanges and interposed between the said first mentioned flanges and the workpieces for protecting the workpieces against marring when the device is used as a miter clamp and to outer surfaces of said first mentioned flanges for providing guides when the device is used as a miter gauge, and another elongated block secured to an outer surface of said third flange for providing a hand grip and having at least a portion of the lower edge thereof projecting below the bottom of said body for providing means for aligning said third flange with an edge of a workpiece when the device is used as a miter gauge.

3. In a device of the type described the combination comprising a sheet metal body, a pair of right angularly disposed upstanding marginal flanges on said body, a clamping member for urging the workpieces toward said flanges and clamped position a third upstanding marginal flange on said body angularly disposed with respect to both of said first mentioned flanges and located diagonally across the body from a corner of the angle between said first mentioned flanges, a pair of elongated blocks of relatively soft material such as wood and the like respectively associated with said first mentioned flanges, means for selectively securing said blocks to inner surfaces of said first mentioned flanges and interposed between the said first mentioned flanges and the workpieces for protecting workpieces when the device is used as a miter clamp and to outer surfaces of said first mentioned flanges for providing guides when the device is used as a miter gauge, said blocks being longer than their associated flanges for overlying a workpiece to provide guides along the surface thereof when the device is used as a miter gauge, and another elongated block secured to said third flange for providing a hand grip and for providing means to facilitate alignment of said third flange with an edge of a workpiece when the device is used as a miter gauge.

4. A device of the type described comprising a sheet metal body, a pair of right angularly disposed upstanding flanges on said body, a clamping member for urging workpieces toward said flanges and clamped position, a pair of spaced flanges upstanding from said body and having aligned threaded apertures therethrough, an elongated screw member threaded through the apertures in said flanges and connected to said clamping member for urging the same toward and away from clamping position, a pair of elongated blocks associated with said first mentioned flanges, and means for selectively securing said blocks to inner surfaces of the first mentioned flanges and interposed between the said first mentioned flanges and the workpieces for protecting the workpieces against marring when the device is used as a miter clamp and to outer surfaces of said first mentioned flanges for providing guides when the device is used as a miter gauge.

References Cited in the file of this patent

UNITED STATES PATENTS

| 722,677 | Crippen et al. | Mar. 17, 1903 |
| 1,246,466 | Reeves | Nov. 13, 1917 |
| 1,416,874 | Reeves | May 23, 1922 |
| 2,228,593 | Dibble et al. | Jan. 14, 1941 |
| 2,322,433 | Gammache | June 22, 1943 |
| 2,669,957 | De Vogt | Feb. 23, 1954 |
| 2,723,692 | Tierney | Nov. 15, 1955 |
| 2,761,476 | Gunas | Sept. 4, 1956 |

FOREIGN PATENTS

| 4,420 | Great Britain | Mar. 5, 1884 |